(12) United States Patent
Lee et al.

(10) Patent No.: US 7,286,824 B2
(45) Date of Patent: Oct. 23, 2007

(54) METHOD FOR CONTROLLING DATA TRANSMISSION RATE IN INTERACTIVE SATELLITE COMMUNICATION SYSTEM

(75) Inventors: Ki-Dong Lee, Seoul (KR); Ho-Jin Lee, Daejon (KR); Ho-Kyom Kim, Daejon (KR); Deock-Gil Oh, Daejon (KR)

(73) Assignee: Electronics and Telecommunications Research Institute (KR)

( * ) Notice: Subject to any disclaimer, the term of this patent is extended or adjusted under 35 U.S.C. 154(b) by 626 days.

(21) Appl. No.: 10/916,965

(22) Filed: Aug. 11, 2004

(65) Prior Publication Data
US 2005/0143003 A1 Jun. 30, 2005

(30) Foreign Application Priority Data
Dec. 24, 2003 (KR) .................. 10-2003-0096830

(51) Int. Cl.
*H04Q 7/20* (2006.01)
(52) U.S. Cl. .................. 455/430; 455/427; 455/67.11; 455/12.1
(58) Field of Classification Search ............. 455/3.02, 455/3.03, 427, 429, 430, 452.1, 452.2, 456.4, 455/9, 12.1, 13.2, 507, 509, 63.1, 67.11, 504, 455/69, 70; 370/468, 435, 318, 465
See application file for complete search history.

(56) References Cited

U.S. PATENT DOCUMENTS 6,169,881 B1 * 1/2001 Astrom et al. ............. 455/12.1
6,418,147 B1 * 7/2002 Wiedeman .................. 370/468
2003/0197639 A1 * 10/2003 Sheynblat et al. ..... 342/357.06
2007/0021060 A1 * 1/2007 Karabinis et al. .......... 455/12.1

* cited by examiner

*Primary Examiner*—Edward F. Urban
*Assistant Examiner*—John J. Lee
(74) *Attorney, Agent, or Firm*—Blakely, Sokoloff, Taylor & Zafman

(57) ABSTRACT

A method for controlling data transmission rate in order to save waste of resources due to Non-Line Of Sight (NLOS) region when a mobile terminal passes through the NLOS region in an interactive satellite communication system is disclosed. The method includes the steps of setting at least one threshold; at a Network Control Center (NCC) adjusting allocated resources based on the Constant Resources Allocation (CRA) after detecting whether Satellite Access Control is lost or not; compensating transmission delay by reallocating if the mobile terminal returns from the NLOS region within a first threshold duration, wherein the mobile terminal maintains the fine sync state during the first threshold duration; and deallocating all resources allocated based on the CRA if the mobile terminal does not return from the NLOS region within the first threshold duration.

5 Claims, 4 Drawing Sheets

METHOD FOR CONTROLLING DATA TRANSMISSION RATE IN INTERACTIVE SATELLITE COMMUNICATION SYSTEM

FIELD OF THE INVENTION

The present invention relates to an interactive satellite communication system; and more particularly, to a method for controlling data transmission rate in order to save waste of resources due to Non-Line Of Sight (NLOS) region in an interactive satellite communication system.

DESCRIPTION OF RELATED ART

In a mobile interactive satellite communication system, plural mobile terminals request a service to a Network Control Center (NCC) through a satellite, and, in response to the request, the NCC provides the service through the satellite to the mobile terminals. Because value of frequency in the mobile satellite communication system is much higher than the value of frequency in a terrestrial mobile communication system, it is very important to minimize shadowing outages occurred when the mobile terminal instantly passes through the NLOS region.

The interactive satellite communication system provides a multimedia service to mobile terminals on the move. However, temporary fading of signal is usually occurred when a mobile terminal passes through the NLOS region. In other words, mobile terminals pass through the NLOS region generally in the mobile interactive satellite network, at that time, data transmission is usually failed. Such a signal cut-off decreases a Quality of Service (QoS) of the mobile interactive satellite communication system and wastes precious radio resources.

In detail, to the mobile interactive satellite communication network, Continuous Rate Assignment (CRA), which allocates resources to maintain a certain transmission rate for the certain period of time and a resource allocation method based on requests from mobile terminals are applied in order to increase the utilization of radio resources and to make target value of the QoS according to service kinds. In CRA, because the scheduler continuously allocates resources to mobile terminals as long as the scheduler doesn't receive a request of resource release, the resources allocated to the mobile terminals are wasted when the mobile terminals have the instant signal cut-off in the NLOS region. Also, if the NCC collects all resources allocated to the mobile terminals having instant signal cut-off for saving resources, set-up time for a new session is needed when the mobile terminals return from the NLOS region. Therefore, the communication cut-off time takes longer, and QoS is decreased.

SUMMARY OF THE INVENTION

It is, therefore, an object of the present invention to provide a data transmission rate control method for saving waste of radio resources due to the NLOS region when a mobile terminal passes through the NLOS region in the interactive satellite communication system.

It is another object of the present invention to guarantee the quality of service by controlling the data transmission rate in the satellite communication system having communication blockage for minimizing the damage of the instant signal cut-off occurred when the mobile terminal instantly enter and/or depart from the NLOS region.

In accordance with an aspect of the present invention, there is provided a method for controlling a data transmission rate in an interactive satellite communication system, the method including the steps of: setting at least one threshold, which is a statistical time duration maintaining a fine sync state while a mobile terminal enters and departs from a Non-Line Of Sight (NLOS) region; at a Network Control Center (NCC) adjusting allocated resources based on the Constant Resources Allocation (CRA) after detecting whether Satellite Access Control (SAC) is lost or not; compensating transmission delay by reallocating if the mobile terminal returns from the NLOS region within a first threshold duration, wherein the mobile terminal maintains the fine sync state during the first threshold duration; and deallocating all resources allocated based on the CRA if the mobile terminal does not return from the NLOS region within the first threshold duration.

In accordance with an aspect of the present invention, there is provided a method for controlling a data transmission rate in an interactive satellite communication system, the method further including the steps of: converting the fine sync state of the mobile terminal into a coarse sync, if the mobile terminal returns from the NLOS region within a second threshold duration; and converting the coarse sync state of the mobile terminal into a log-on initial state, if the mobile terminal does not return from the NLOS region within the second threshold duration.

In accordance with an aspect of the present invention, there is provided a method for controlling a data transmission rate in an interactive satellite communication system, the method further including the steps of: converting the coarse sync state of the mobile terminal into the log-on initial state, if the mobile terminal returns from the NLOS region within third threshold duration; and logging off by terminating the log-on state, if the mobile terminal does not return from the NLOS region within the third threshold duration.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
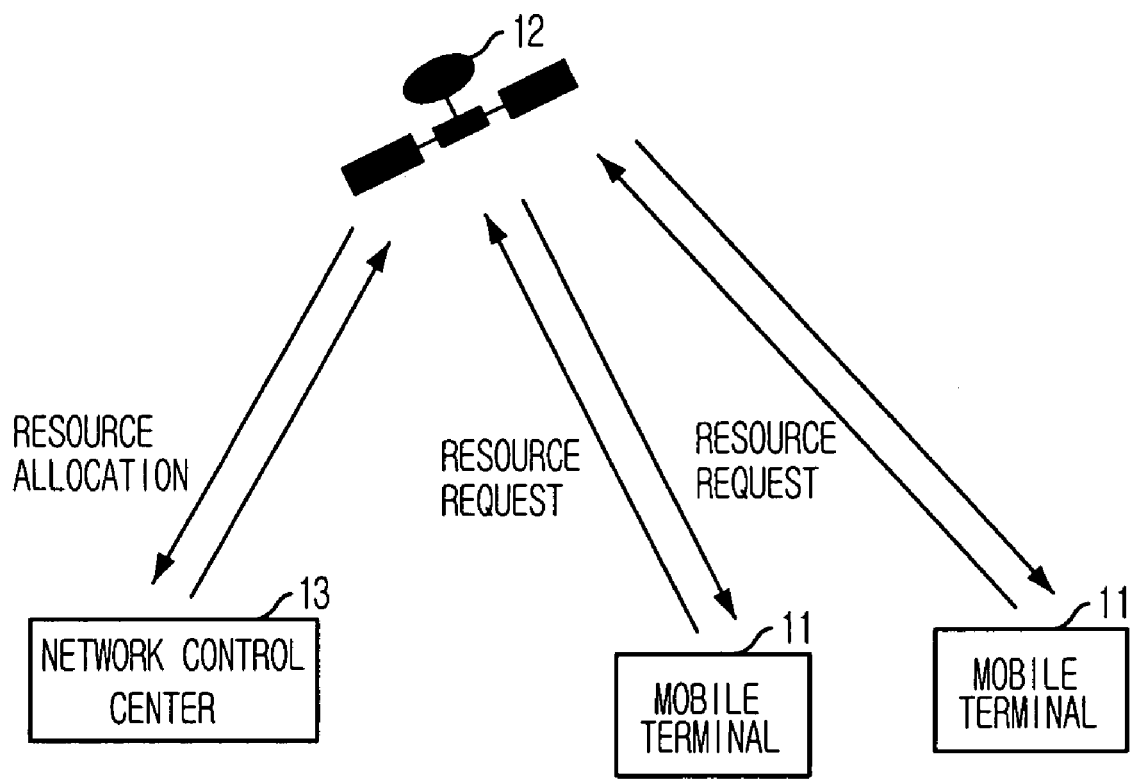
FIG. 1 is a diagram showing an interactive satellite communication system to which the present invention is applied.

FIG. 1 is a diagram showing an interactive satellite communication system to which the present invention is applied.

The interactive satellite communication system is a satellite network, wherein, plural mobile terminals 11 request a service to Network Control Center (NCC) 13 through a satellite 12, in response to the request from the mobile terminal 11, the NCC 13 provides the service to the mobile terminal 11 through the satellite 12. In this network, it is very important to adjust the allocated resources to the mobile terminal having trouble of the communication cut-off in the NLOS region.

As shown, the interactive satellite communication system in this embodiment includes a satellite 12, a NCC 13 and plural mobile terminals 11. It is apparent that an interactive satellite communication system including plural satellites 12, plural NCCs 13 and plural mobile terminals 11, could be implemented by combining or modifying the system in accordance with the present invention including the present system.

Each of plural mobile terminals 11 requests the required resources and uses the allowed resources, i.e., time slot, by the NCC 13 in response to the request from the mobile terminal 11.

The NCC 13 collects resource requests from the mobile terminals 11, and selects the time slot for allocating to each of mobile terminals 11, and reports to the related mobile terminals through the satellite 12.

Particularly, because the NCC 13 includes a data transmission rate control algorithm for minimizing damage of the communication cut-off generated when the mobile terminal 11 instantly enters into and/or departs from the NLOS region, the NCC 13 receives requests of frequency resources from plural mobile terminals 11, and preserves the average transmission rate by compensating transmission rate due to instant communication cut-off generated when the mobile terminal passes through the NLOS region.

Figure 2:
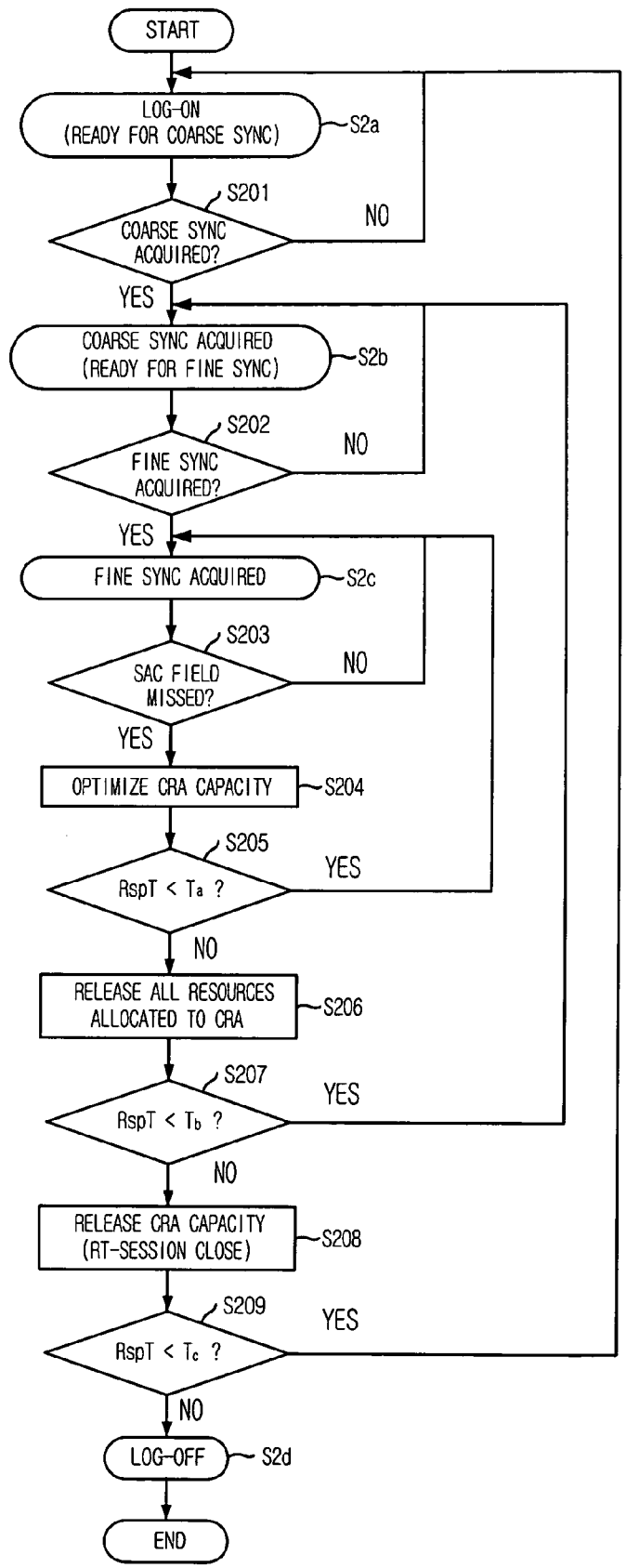
FIG. 2 is a flowchart illustrating a method for controlling data transmission rate in accordance with an embodiment of the present invention.

FIG. 2 is a flowchart illustrating a method for controlling a data transmission rate in accordance with the present invention, and showing the method for determining state of the mobile terminal 11 by the NCC 13 while the mobile terminal 11 passes through the NLOS region.

The transmission rate control algorithm in accordance with the present invention, for the prevention of the resource waste, determines the state of the mobile terminal 11 based on the multi-stage of the return time from the NLOS region, and collects partially the allocated resources according to the stage because the related resources are wasted when the mobile terminal 11 passes the NLOS region and have communication cut-off in the NLOS region.

Herein, the NCC 13 determines the state of the mobile terminal 11 based on the return time, which is time duration between the instants of entering and departing from the NLOS region.

Hereinafter, "fine sync" means as a state, which the time is accurately synchronized means for normal data transmission. "Coarse sync" means a state before the fine sync, which the time is roughly synchronized. "RspT" denotes response time, which is detecting time after the occurrence of the event. "rt-session" denotes a real-time session.

"Terminal Burst Time Plan (TBTP)" is referred to an allocation plan of time slots. $t_a$ is a statistical time duration for maintaining the fine sync state after returning from the NLOS region. For the embodiment of the present invention, $t_a$, $t_b$ and $t_c$ could be assumed based on the method of the ordinary least square technique.

$c_j$, $x_j$ and $y_j$ denote resources allocated to the mobile terminal 11 by the NCC 13 when the mobile terminal 11 enters and/or departs from the NLOS region.

c, $c_j$, $x_j$, $y_j$ and p are design parameters, and could be determined based on a statistical assumption or a strategy of the service provider.

A process for decreasing and compensating the resources allocated to the mobile terminal 11 by the CRA method will be described hereafter.

In the interactive satellite communication network, at step S2a, when the mobile terminal 11 logs on and gets ready to be the coarse sync, at step S201, the mobile terminal 11 acquires coarse sync and at step S2b, gets ready to be the fine sync. At step S202, when the mobile terminal 11 gets ready to be the fine sync, the mobile terminal 11 acquires the fine sync. At step S2c, the mobile terminal 11 communicates with the NCC 13 in the fine sync.

At step S203, if the NCC 13 couldn't receive a Satellite Access Control (SAC) field, which is a field indicating control information from the mobile terminal 11 for connecting with the satellite 12, at step S204, the NCC 13 assumes that the mobile terminal 11 exists in the NLOS region, and reallocates resources allocated by the CRA, that is, optimizes the CRA capacity.

Thereafter, at step S205, if the mobile terminal 11 does not return from the NLOS region in $t_a$, at step S206, the NCC 13 collects resources allocated by the CRA. At step S2c, if the mobile terminal 11 returns from the NLOS region in $t_a$, the mobile terminal 11 maintains the fine sync.

Figure 3:
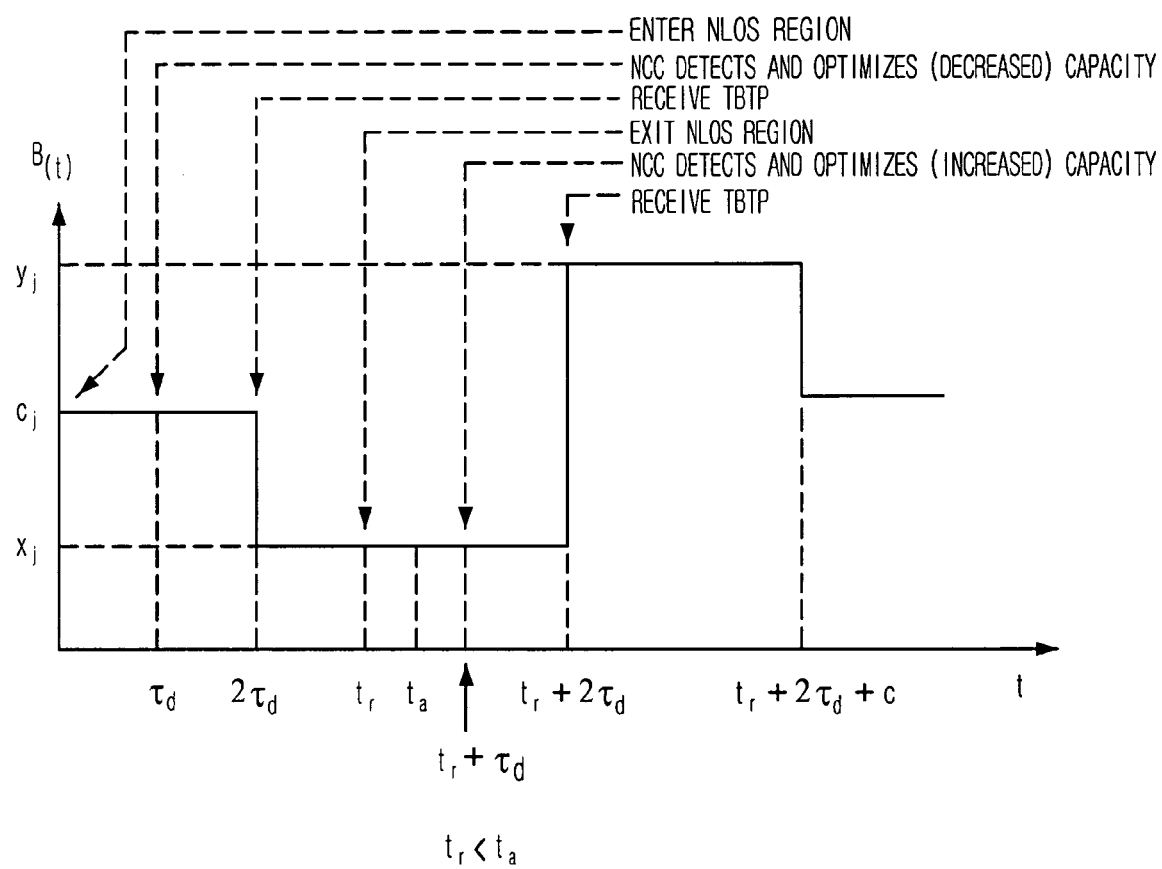
FIGS. 3 and 4 are graphs describing an adaptive resources collection quantity as frequency occupancy state by controlling data transmission rate in accordance with an embodiment of the present invention.

Herein, though the mobile terminal 11 returned from the NLOS region, the NCC 13 does not start collecting resources until $t_a$ so that the mobile terminal 11 could immediately restart receiving data at the speed of $x_j$ in FIG. 3 in the fine sync when the mobile terminal 11 returns in the fine sync.

At step S207, if the mobile terminal 11 didn't return in $t_b$ from the NLOS region, at step S208, the NCC 13 converts state of the mobile terminal 11 into former state, i.e., the logon state, that is, the all allocated resources will be returned and the rt-session will be terminated. At step S2b, if the mobile terminal 11 returns from the NLOS region in $t_b$, the mobile terminal 11 maintains the coarse sync, i.e., ready to be the fine sync.

Then, at step S209, if the mobile terminal 11 does not return from the NLOS region in $t_c$, at step S2d, the NCC 13 logs off, i.e., terminates the logon by force. At step S2a, if the mobile terminal 11 returns from the NLOS region, the mobile terminal 11 maintains the logon state.

When the mobile terminal 11 maintains the fine sync, traffic can be transmitted received and the mobile terminal 11 responses to the NCC 13 in $t_a$. There are some cases could be occurred. One is the case that the mobile terminal 11 departs from the NLOS region after the NCC 13 detecting the mobile terminal's 11 being in the NLOS region generates the TBTP, referred in FIG. 3. Another is the case that the mobile terminal 11 departs from the NLOS region before receiving the TBTP generated by the NCC 13, referred in FIG. 4.

Figure 4:
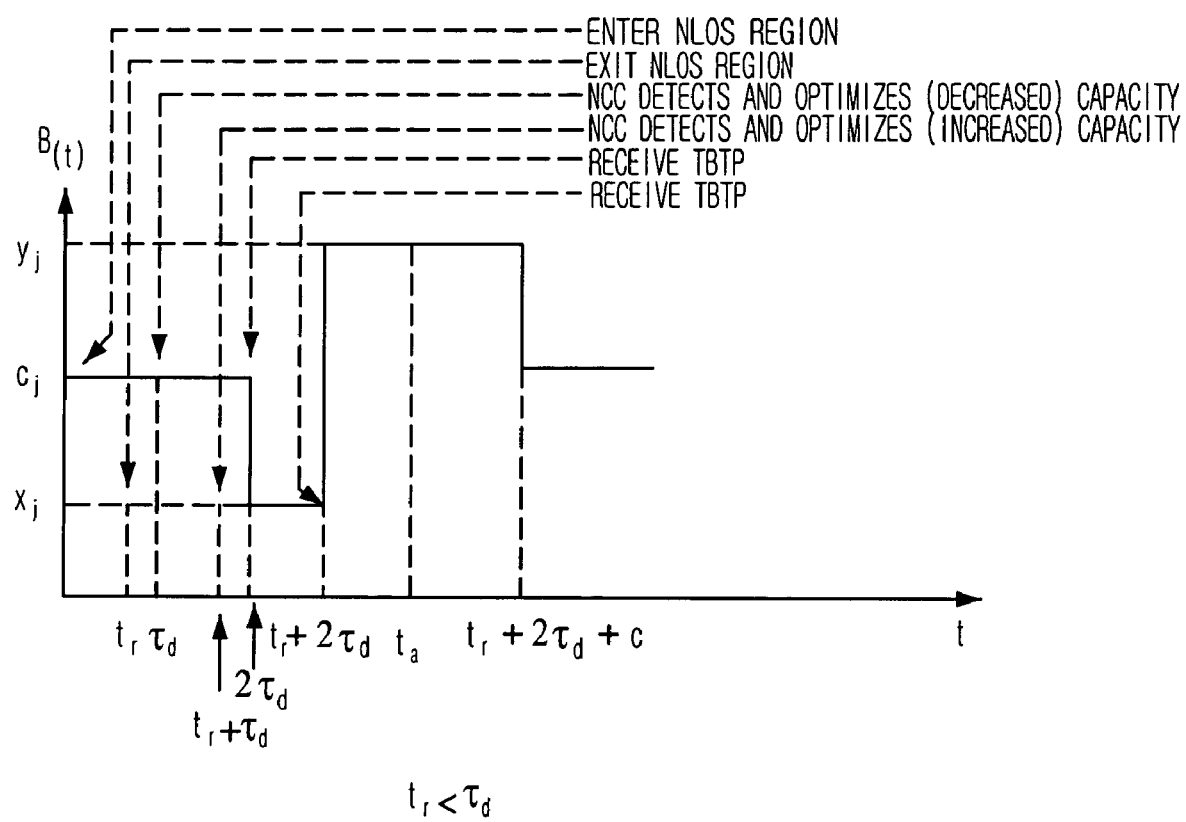

FIGS. 3 and 4 are graphs showing the method for controlling data transmission rate, i.e., controlling the resource allocation in accordance with the present invention.

The reason of having duration of $t_a$ after entering the NLOS region by the mobile terminal 11 is to restart transmitting data at the rate of $x_j$ immediately when the mobile terminal in the "fine sync" state returns from the NLOS region.

Based on the a scenario for controlling the resource allocation according to the present invention, the mobile terminal 11 enter the NLOS region at time 0, the NCC 13 detects the entrance of the mobile terminal 11 in the NLOS region at $\tau_d$ and transmits the TBTP in order to reallocate the allocated resources from $c_x$ to $x_j$, and the mobile terminal receives the TBTP at time $2\tau_d$. The mobile terminal 11 has resources as $x_j$ at time $2\tau_d$. Herein, the mobile terminal 11 could depart from the NLOS region after receiving the TBTP, referred in FIG. 3, and departs from the NLOS region before receiving the TBTP referred in FIG. 4.

When the mobile terminal 11 enters the NLOS region, the allocated resources are reallocated as $x_j$, that is, the capacity of $c_j$-$x_j$ will be released, referred at the step S204 in FIG. 2. If the mobile terminal 11 doesn't return within $t_a$, referred at the step S205 in FIG. 2, the all allocated resources are released, referred at the step S206 in FIG. 2. If the mobile terminal 11 returns from the NLOS region, referred at the step S205 in FIG. 2, the NCC 13 allocates resources as $y_j$ according to probability of p, i.e., $y_j$-$c_j$. The NCC 13 reallocates resources after the mobile terminal 11 returns in order to decrease the risk that the mobile terminal 11 enters the NLOS region at point of the resource reallocation.

The effect of the present invention will be shown as the state of the frequency allocation in FIGS. 3 and 4.

FIG. 3 illustrates the effect in the case of $t_r < t_a$ wherein $t_r$ denotes a time between the mobile terminal 11 enter the NLOS region and returns from the NLOS region.

From time 0 to time $t_r + 2\tau_d + c$, an amount of the allocated the frequencies is obtained by an equation 1 according to the conventional allocation method. In the present invention, an amount of the allocated frequencies from 0 to $t_r + 2\tau_d + c$ is calculated by equation 2.

It is obvious that the allocated but unused resources are decreased based on equation 3 in accordance with the present invention.

$$\int_0^{t_r+2\tau_d+c} c_j\,du = c_j \cdot (t_r + 2\tau_d + c) \qquad \text{Eq. (1)}$$

$$\int_0^{t_r+2\tau_d+c} B(u)\,du = c_j \cdot (2\tau_d) + x_j \cdot t_r + y_j \cdot c \qquad \text{Eq. (2)}$$

$$(c_j \cdot t_r) - (c_j \cdot 2\tau_d + x_j \cdot (t_r - 2\tau_d)) = (c_j - x_j) \cdot (t_r - 2\tau_d) > 0 \qquad \text{Eq. (3)}$$

The adaptive released resources could be provided to other mobile terminals in accordance with the present invention. The NCC 13 allocates resources as $y_j$-$c_j$ based on probability of P for transmitting data delayed by passing through the NLOS region.

Herein, the allocation of the frequency by probability is for decrease the risk that the mobile terminal enters the NLOS region. The NCC could minimize the capacity of the allocated but unused resources.

As above-mentioned, the data transmission rate control method in accordance with the present invention can be embodied as a program and stored in recording media readable by a computer, e.g., CD-ROM, RAM, floppy disk, hard disk, magneto-optical disk, etc.

The data transmission rate control method prevents a waste of radio resources by minimizing resources which are allocated to the terminal but unused, and guarantees the QoS in the interactive satellite communication system having a signal cut-off when the mobile terminal passes through the NLOS region.

The present application contains subject matter related to Korean patent application no. 2003-96830, filed in the Korean intellectual Property Office on Dec. 24, 2003, the entire contents of which being incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for controlling a data transmission rate in an interactive satellite communication system, the method comprising the steps of:
   a) setting at least one threshold, which is a statistical time duration maintaining a fine sync state while a mobile terminal enters and departs from a Non-Line Of Sight (NLOS) region;
   b) at a Network Control Center (NCC) adjusting allocated resources based on the Constant Resources Allocation (CRA) after detecting whether Satellite Access Control (SAC) is lost or not;
   c) compensating transmission delay by reallocating if the mobile terminal returns from the NLOS region within a first threshold duration, wherein the mobile terminal maintains the fine sync state during the first threshold duration; and
   d) deallocating all resources allocated based on the CRA if the mobile terminal does not return from the NLOS region within the first threshold duration.

2. The method as recited in claim 1, further comprising the steps of:
   e) converting the fine sync state of the mobile terminal into a coarse sync, if the mobile terminal returns from the NLOS region within a second threshold duration; and
   f) converting the coarse sync state of the mobile terminal into a log-on initial state, if the mobile terminal does not return from the NLOS region within the second threshold duration.

3. The method as recited in claim 2, further comprising the steps of:
   g) converting the coarse sync state of the mobile terminal into the log-on initial state, if the mobile terminal returns from the NLOS region within third threshold duration; and
   h) logging off by terminating the log-on state, if the mobile terminal does not return from the NLOS region within the third threshold duration.

4. The method as recited in claim 1, wherein the NCC determines a state of the mobile terminal based on the return time of the mobile terminal from the NLOS region, and deallocates the allocated resources partially, and compensates data transmission delay by reallocating resources after deallocating the resources based on the multi-stage state of the mobile terminal.

5. The method as recited in claim 4, wherein the resource reallocation is operated statistically in order to minimize the risk that the mobile terminal enters the NLOS region.

* * * * *